(12) United States Patent
Nix, III et al.

(10) Patent No.: US 12,249,727 B2
(45) Date of Patent: Mar. 11, 2025

(54) SYSTEM AND METHOD FOR STORAGE AND WITHDRAWAL OF ELECTRICAL ENERGY FROM A SUBTERRANEAN ENVIRONMENT

(71) Applicants: Kenneth Wayne Nix, III, Midland, TX (US); Ryan Patrick Edwards, Midland, TX (US)

(72) Inventors: Kenneth Wayne Nix, III, Midland, TX (US); Ryan Patrick Edwards, Midland, TX (US)

( * ) Notice: Subject to any disclaimer, the term of this patent is extended or adjusted under 35 U.S.C. 154(b) by 59 days.

(21) Appl. No.: 18/120,576

(22) Filed: Mar. 13, 2023

(65) Prior Publication Data

US 2023/0291053 A1 Sep. 14, 2023

Related U.S. Application Data

(60) Provisional application No. 63/319,293, filed on Mar. 12, 2022.

(51) Int. Cl.
| | | |
|---|---|---|
| *H01M 50/251* | (2021.01) | |
| *H01M 10/613* | (2014.01) | |
| *H01M 10/64* | (2014.01) | |
| *H01M 10/6556* | (2014.01) | |
| *H01M 50/204* | (2021.01) | |

(52) U.S. Cl.
CPC ....... *H01M 50/251* (2021.01); *H01M 10/613* (2015.04); *H01M 10/64* (2015.04); *H01M 10/6556* (2015.04); *H01M 50/204* (2021.01)

(58) Field of Classification Search
CPC .. H01M 50/251; H01M 10/613; H01M 10/64; H01M 10/6556; H01M 50/204
See application file for complete search history.

(56) References Cited

U.S. PATENT DOCUMENTS

| | | |
|---|---|---|
| 4,675,259 A | 6/1987 | Totty |
| 5,122,938 A | 6/1992 | Pastusek |
| 5,360,062 A | 11/1994 | White |
| 5,392,856 A * | 2/1995 | Broussard, Jr. ......... E21B 41/00 166/66.4 |
| 6,014,013 A | 1/2000 | Suppanz et al. |
| 6,131,659 A | 10/2000 | Johnson |
| 6,380,476 B1 | 4/2002 | Heijnen et al. |
| 6,610,441 B2 * | 8/2003 | Hensley ............. H01M 50/247 429/174 |
| 6,684,948 B1 | 2/2004 | Savage |
| 6,848,503 B2 | 2/2005 | Schultz et al. |
| 7,086,481 B2 | 8/2006 | Hosie et al. |
| 7,125,604 B2 | 10/2006 | Depaola et al. |
| 7,168,508 B2 | 1/2007 | Goldberg et al. |

(Continued)

OTHER PUBLICATIONS

Matos, Tania (authorized officer); ISA/US; International Search Report mailed Jan. 22, 2024 for PCT/US2023/032503.

*Primary Examiner* — Carlos Amaya
(74) *Attorney, Agent, or Firm* — Vorys, Sater, Seymour and Pease LLP

(57) ABSTRACT

A system and method for a subterranean energy storage and retrieval system, having constructed a subterranean battery from a repurposed wellbore with ganged cells with an electrical connection attached to the battery at the surface of the wellbore. A cooling system cools the battery cells downhole. A pressure activated switch is normally open until the battery cells are resting on the bottom hole retainer.

20 Claims, 18 Drawing Sheets

(56) References Cited

U.S. PATENT DOCUMENTS

| | | |
|---|---|---|
| 7,172,038 B2 | 2/2007 | Terry et al. |
| 7,661,476 B2 | 2/2010 | Yeh et al. |
| 7,699,102 B2 | 4/2010 | Storm et al. |
| 7,748,466 B2 | 7/2010 | Aivalis |
| 7,749,466 B2 | 7/2010 | Vitucci et al. |
| 7,980,331 B2 * | 7/2011 | Hall .............. E21B 41/0085 |
| | | 175/320 |
| 8,242,928 B2 | 8/2012 | Prammer |
| 8,284,075 B2 | 10/2012 | Fincher et al. |
| 8,616,293 B2 | 12/2013 | Robertson |
| 8,905,139 B2 | 12/2014 | Arizmendi, Jr. et al. |
| 8,931,553 B2 | 1/2015 | Cannan et al. |
| 9,617,829 B2 | 4/2017 | Dale et al. |
| 9,976,351 B2 | 5/2018 | Randall |
| 10,408,047 B2 | 9/2019 | Morrow |
| 10,465,505 B2 | 11/2019 | Disko et al. |
| 10,597,944 B2 | 3/2020 | Randall |
| 10,598,810 B2 | 3/2020 | Mandviwala et al. |
| 10,704,383 B2 | 7/2020 | Andreychuk et al. |
| 10,784,520 B2 | 9/2020 | Navarro et al. |
| 10,907,427 B2 | 2/2021 | Bellicard et al. |
| 10,914,138 B2 | 2/2021 | Tubel et al. |
| 10,961,845 B2 | 3/2021 | Roberson et al. |
| 11,193,332 B2 | 12/2021 | Jelsma et al. |
| 2007/0003831 A1 | 1/2007 | Fripp et al. |
| 2012/0091964 A1 | 4/2012 | Vance et al. |
| 2012/0121961 A1 | 5/2012 | Hall |
| 2013/0026978 A1 | 1/2013 | Cooley et al. |
| 2013/0106366 A1 | 5/2013 | Fripp et al. |
| 2013/0130078 A1 | 5/2013 | Schaefer et al. |
| 2015/0044527 A1 | 2/2015 | Neudecker et al. |
| 2016/0087271 A1 | 3/2016 | Jarvis et al. |
| 2016/0380247 A1 * | 12/2016 | Juzkow .............. H01M 50/204 |
| | | 429/99 |
| 2021/0207781 A1 | 7/2021 | Lockwood et al. |
| 2021/0335555 A1 | 10/2021 | Oladeji |
| 2021/0336478 A1 * | 10/2021 | Chaves .................. H02J 15/007 |
| 2021/0404312 A1 | 12/2021 | Quero et al. |
| 2022/0025714 A1 | 1/2022 | Moellendick et al. |
| 2022/0102770 A1 * | 3/2022 | Whitman ............ H01M 10/613 |

* cited by examiner

SYSTEM AND METHOD FOR STORAGE AND WITHDRAWAL OF ELECTRICAL ENERGY FROM A SUBTERRANEAN ENVIRONMENT

CROSS REFERENCE TO RELATED APPLICATIONS

This patent application claims priority from U.S. provisional patent application Ser. No. 63/319,293 and entitled A System And Method For Storage And Withdrawal Of Electrical Energy From A Subterranean Environment Filed On Mar. 12, 2022, by which Is hereby incorporated by reference in its entirety.

BACKGROUND OF THE INVENTION

Large footprint surface battery banks are often used as an energy buffer to address both peak, over demand from the nation's electric grid as well as non-peak output hours for wind and solar power generation. Surface batteries, however, have inherent risks associated with them. They require a large footprint and are open to the outside environment if a hazardous chemical situation were to happen. Battery fires are an added risk.

FIELD OF THE INVENTION

The invention relates to the field of energy storage.

SUMMARY OF THE INVENTION

A system and method for a subterranean energy storage and retrieval system, converting a wellbore to a storage battery by installing chemical power cells in the wellbore with an electrical connection attached to the battery at a surface of the wellbore. A cooling system cools the power cells downhole. A pressure activated switch is normally open until the battery is constructed and all power cells are resting on the bottom hole retainer.

BRIEF DESCRIPTION OF THE DRAWINGS

The drawings presented herein are for illustrative purposes only and do not limit the scope of the claims. Rather, the drawings are intended to help enable one having ordinary skill in the art to make and use the claimed inventions. The drawings are not drawn to scale.

DETAILED DESCRIPTION OF AN ILLUSTRATIVE EMBODIMENT OF THE INVENTION

Figure 1:
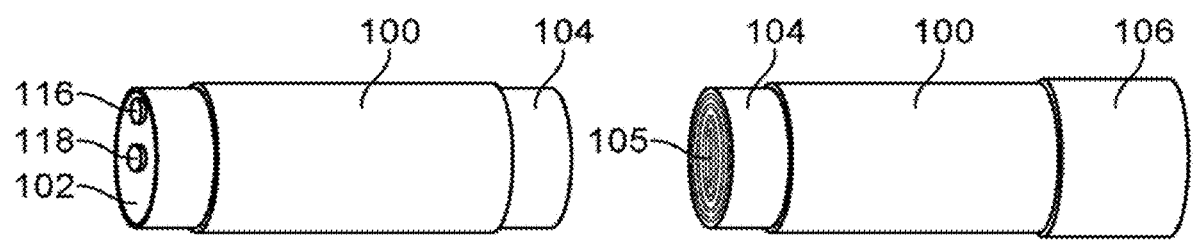
FIG. 1 depicts a side view of a particular illustrative embodiment of the invention.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are drawn to scale, but do not show all the structural details, nor do they limit the scope of the claims.

Many of the technology approaches today to recycle an oil and gas well for energy storage are attempting to use geological formations within the earth to store various forms of heat or potential energy in order to bring it into the electrical grid on demand. There are inherent inefficiencies surrounding the use of the earth's geological formations. The storage industry likes the idea that these formations have floors and ceilings due to the various existing cap rocks which can halt the upward or downward movement of the gasses and fluids but those who are pursuing these technologies have not solved the issue of horizontal movement in a porous formation coupled with the need for very large recharge volumes in order to store enough energy to be relevant. If there is a geologic solution that is found, it is usually unique to a specific location, such as a salt dome, and is unique to that location and not replicable elsewhere.

Thus the inventors saw a long felt need for a solution. By changing the focus from kinetic energy to chemical batteries, it became clear that the solution does not include the formation at all. With battery banks stored and safely trapped underground, environmental concerns and surface footprint concerns are mitigated. Any potential hazardous components are contained in a polymer shell, inside sealed steel tubing, inside sealed steel casing with a cement sheath around it. By focusing on the wellbore, the present invention provides a solution that is economical, scalable, and even environmentally friendly due to the repurposing of borehole equipment that is readily available and in current use. The present invention discloses a system and method for converting an existing oil and gas borehole into a singular large capacity battery, also referred to herein as a "borehole battery", "battery sticks" wherein multiple cells are ganged together to form battery sticks which are connected together to form the borehole battery or large capacity battery.

In a particular illustrative embodiment of the invention, a battery stick formed from a plurality of connected battery cells stores electrical energy, i.e., a "borehole battery." This arrangement completely transforms the functional use of an unused and abandoned borehole, changing the abandoned borehole to a borehole battery which provides power on demand to users at the surface of the borehole. it could also include wells that are nearing the end of their economic life and are a P&A candidate. The closer the well is to the end of its economic life, which can also be a component of the price of oil and gas at the time of evaluation, it may make sense to accelerate the conversion of the well into an electrical storage device as that will provide a higher return on capital to the owner of the well. Economics can play a big part in an owner of the wellbore looking to maximize their return on their original sunk capital in that hole. The short of this is there are more candidates than just unused or abandoned wells that can use this technology. Depending on what happens to the price and oil/gas/electricity in the future, the potential exists that a well with plentiful reserves of oil and/or gas could still be converted to a battery because it is more economically viable. The borehole no longer functions as a part of a system that extracts natural resources from a subterranean environment. In a particular illustrative embodiment of the invention, a system and method is disclosed that combines various repurposed items utilized in the oil and gas industry along with some proprietary items in order to create a large subterranean energy storage (borehole) battery.

In a particular illustrative embodiment of the invention, the system and method are used to convert an oil and gas borehole, in some instances, an abandoned borehole into a battery. During the conversion, the system and method are used to seal a vertical section or "interval" of a wellbore in order to prevent any communication of the sealed interval of the wellbore with a surrounding formation. The sealed interval could have previously been a productive interval of the wellbore. The final plug in the conversion of the borehole into a battery yields a sealed and isolated cylinder within the sealed interval of the wellbore, providing a foundation of the battery construction. That final plug now becomes the solid base of the battery and is involved as a part of a mechanism that can energize/de-energize the cells that make up the battery wherein the battery includes but is not limited to the wellbore that serves an outer shell for the battery and the many other pieces contained within it. This conversion of an oil and gas wellbore could be generally the same for any well that was drilled but never put into production or for other types of wellbores such as geothermal.

In a particular illustrative embodiment of the invention, the system and method repurpose a wellbore of an existing oil and gas well. Currently, when an oil or gas well is deemed to be no longer economically viable, the person or entity who owns the individual well is required to initiate a process commonly referred to as P&A (plugging and abandonment). This conversion process involves multiple steps and materials all intended to stop any migration of fluids and or gases, trapping them in place in their subterranean environment surrounding the borehole. This process protects shallower formations, water tables, and the surface environment. The end result is a completely sealed borehole that is no longer accessible for any use what so ever from the surface down to the original drill depth.

Over time, the market has attempted to address how to reuse, or continue use of these wells after the useable economic lifespan of the original wellbore has been exhausted. There are technologies in existence that indeed address this. Current technology in the industry has focused on the reservoir as a kinetic/potential energy storage vessel for electricity generation. According to Science Direct, the main Underground Energy Storage Technologies ("UEST") for renewable integration being used today are: Compressed Air Energy Storage ("CAES"); Underground Hydro Storage ("UPHS"); Underground Thermal Energy Storage ("UTES"); Underground Gas Storage ("UGS"); and Underground Hydrogen Storage ("UHS").

These energy formation storage technologies are all associated with potential energy primarily in the form of chemical storage or kinetic energy in the form of thermal and motion energy where as there is a reaction that potentially creates electrical energy through a secondary surface electrical generator that can be transmitted to the grid. The main point of note with all of these methods is that the UESTs mentioned above all use a borehole as an access point/conduit to move something from above the surface into a subterranean environment. In every discoverable case, the wellbore is a means to an end, a pathway to input and extract kinetic or thermal energy. The wellbore is not an actual storage vessel for anything. The earth's formation is the storage vessel.

The inventors have not found any circumstances in which anyone has repurposed an oil and gas wellbore into a battery. In a particular illustrative embodiment of the invention, the system and method completely change the intended use and purpose of an existing wellbore by constructing a battery made within an isolated wellbore that is a source of electric power consisting of one or more electrochemical cells with external connections for powering electrical devices. Not only does the present invention not have anything to do with kinetic energy storage, but the battery design seals the formation from the battery as a matter of primary functionality. The inventors believe that this construction and utilization of a sealed and isolated wellbore is completely unique in purpose and in practice to the way any wellbore formation is utilized currently.

In the past, small form factor batteries have been utilized in a wellbore to power small downhole devices such as memory gauges and small valves. This use of small form factor batteries is not unique in oil and gas extraction where the formation is monitored or access to the formation is controlled. These small form factor batteries are a onetime, limited use purpose. In these cases, the cells enter the wellbore with a charge and cannot be recharged while in the wellbore. Having an operational life of only a few hours, the small form factor batteries are meant to power a device downhole and will either come out of the well after treatment or will be permanently abandoned downhole. These small form factor batteries or battery cells cannot power anything at surface, have no conductive connection to the surface, cannot be monitored while in the well, and cannot be serviced while in the wellbore. Furthermore, this use of small form factor batteries is not intended, nor does the ability exist to act as a storage vessel for charging, storing, and extracting electricity to the surface in any way.

In a particular illustrative embodiment of the invention, the system and method do not provide a battery to power downhole equipment as in the above example, rather, the present invention provides power storage for use at the surface. In a particular illustrative embodiment of the invention, the system and method accepts a charge from surface; stores a charge for a period of time downhole; and enables extraction of the stored energy back to surface. Unlike the current and past use of downhole batteries, the present invention provides a subterranean wellbore battery ("borehole battery") that is connected to the wellbore surface, wherein the borehole battery is charge cycled over and over again in place downhole, and again, will not have anything to do with the reservoir that has been abandoned and sealed away from the wellbore.

The inventors believe that converting a wellbore into a battery meets a long felt need and thus passes the litmus test of being non-obvious. It has been a long standing practice of Oil and Gas producers, as well as various regulatory bodies, to P&A wells and never use them again. The "A" in P&A does stand for abandonment. The P&A process has been around since at least the late 1800's. It is our belief that a significant amount of time has passed, as well as a significant amount of people involved in the process, for the invention to be deemed as non-obvious as solving a problem and providing a long felt needed solution.

In a particular illustrative embodiment of the invention, the system and method are used to convert a wellbore that recycles, repurposes, and transforms the wellbore and associated existing and in place equipment into a literal large capacity chemical battery, i.e., a borehole battery, wherein the battery utilizes lithium, lead, sodium ion, or any other chemical battery technology where an anode, a cathode, an electrolyte medium, and permeable barrier is provided.

In a particular illustrative embodiment of the invention, the system and method provides an exterior casing on the individual battery cells that combine to make up the borehole battery. The exterior battery casing shields and protects the borehole battery and the individual battery cells that make up the borehole battery that is inserted into the borehole, wherein the exterior casing protects the borehole battery and its aggregation of individual battery cells from external physical forces that could damage the borehole battery.

In a particular illustrative embodiment of the invention, the system and method provide a borehole battery that operates in a vertical configuration constructed in a wellbore, in a subterranean environment, thereby minimizing the surface footprint the battery. In a particular illustrative embodiment of the invention, the borehole battery is constructed extending from a borehole surface and down into a wellbore several thousand feet below the surface into which the borehole is drilled, subjecting the borehole battery to tectonic forces present downhole, in which the batteries' external casing would protect it from. In a particular illustrative embodiment of the invention, the battery cells are placed in a recycled wellbore casing that provides robust protection of the battery cells contained therein. If one were to build a subterranean battery without recycling a wellbore, the hole that would be drilled to house the battery cells should be lined with a protective casing. Thus, the protective casing is a preferred structural component for maintaining the integrity of the borehole battery downhole.

As modern large capacity battery packs sometimes require a way to cool the battery, so too does the subterranean borehole battery. In a particular illustrative embodiment of the invention, a cooling system circulates a cooling medium, a gas such as air or nitrogen, or a fluid such as water, is pumped downhole and caused to flow across the power cells (battery cells) that make up the borehole battery while deployed downhole. The wellbore casing containing the battery cells and provides a flow path that facilitates a cooling chamber by circulating air or a fluid to cool the battery cells. The cooling medium is pumped and flows from surface, down an inner annulus provided in and through the borehole battery power cells, and then back up to the surface through the cell's outer annulus space. The outer annular space is created by a space between the recycled wellbore's internal diameter and the smaller outside diameter of the borehole battery's individual battery cells outside diameter. Just like any other high-capacity battery, without this needed cooling, the battery would suffer premature failure. The wellbore provides a cooling flow return path for cooling the battery.

Chemical battery cells have a cathode and an anode. Of course, both the cathode and anode are electrically connected to the system to harness the battery's functionality. The subterranean borehole battery is no different. Access to the top connection for the wellbore battery is fairly simple to connect to, as it is at surface. The bottom of the battery, several thousand feet underground in the wellbore, is more complicated. Once again, the space between the recycled wellbore and the battery cells forms an outer annulus between the surface of the battery and the inside wall of the wellbore that is also utilized as an electrical path for this electrical connection at the surface of the wellbore. With this access, a connection point to the bottom of the battery is provided through the outer annulus.

In a particular illustrative embodiment of the invention, the wellbore casing is a part of the battery. The present invention goes far beyond merely storing cells in a wellbore. The fact that the casing from the well was at one point part of the well could be considered secondary to the invention using the repurposed wellbore casing as an appropriate material and geometry to provide a stable battery housing, structural support, connection access, and a flow path for cooling. The casing in the wellbore is recycled and repurposed to become a real functional part of the borehole battery itself.

In a particular illustrative embodiment of the invention, the system and method provide a borehole battery for large scale storage of electrical energy. Many existing wells in the United States as well as the world are extremely deep and could house connected cells to form a borehole battery up to lengths over a mile long. In a particular illustrative embodiment of the invention, the system and method extends the useful life of an existing item, such as a wellbore casing by fully repurposing it. In a particular illustrative embodiment of the invention, the system and method enhances electrical grid safety by impeding access from a terroristic surface threat or natural disaster due to the limited exposed footprint of the battery. In a particular illustrative embodiment of the invention, the system and method utilize a minimal surface footprint compared to other competitive grid related storage systems. No additional disruption is needed to surrounding environments as the system and method of the present invention use an existing electrical grid, ground transportation access, and an existing surface pad whereas many competing grid storage solutions are not in a wellbore and involve building large surface facilities and disrupting the environment around it.

In a particular illustrative embodiment of the invention, the borehole battery cells can be recycled and replaced with different or new emerging battery technologies as they are developed, which can be less impactful on the environment and allow for higher storage density of electrons. All of the costs associated with building out a well have already been sunk allowing for a significant reduction in build out costs for each potential battery location.

In another particular illustrative embodiment of the invention, the system and method repurposes oilfield related tubing to house cells of the borehole battery. This is similar to the repurposing of the wellbore described above, in converting wellbore tubing into a battery as the system and method completely changes the intended use and purpose of an existing item, wellbore tubing. The inventors are unaware of any circumstances in which anyone has repurposed oil and gas tubing into a housing for battery related cells. The inventors believe that converting oilfield tubing as a housing of battery cells is a nonobvious use of the wellbore tubing. According to the Society of Petroleum Engineers ("SPE") PetroWiki site, tubing is defined as "the normal flow conduit used to transport produced fluids to the surface or fluids to the formation." SPE further defines the purpose as "the use of tubing permits better well control because circulating fluids can kill the well . . . " In the past, tubing has been used to move fluids and gas inside of a wellbore and not to statically store something such as a cell of a battery which is accomplished by the present invention. Using tubing within oil and gas wells has been a vital part of the wells for many, many years and the inventors believe that a significant amount of time has passed, as well as a significant amount of people involved in the process, for the solution provided by the present invention to be deemed a long felt need and nonobvious.

In a particular illustrative embodiment of the invention, the system and method use of tubing as a battery cell storage device to create a tubing-based borehole battery, that provides many benefits in being a part of a wellbore battery system. The tubing is readily available and provides a strong housing material for the battery cells that make up a borehole battery in tubing, which allows for compacting the density of the battery cell increasing the effectiveness of each battery cell. The tubing makes it easy to install and retrieve within the battery casing, as it works with existing workover equipment. In a particular illustrative embodiment of the invention, the system and method provides for the connection of multiple cells through the threaded ends of each piece of tubing.

The inventors believe that by changing the intended purpose of an oil and gas well and associated wellbore equipment and hardware, from that which is involved in the extraction of hydrocarbons, to that of being a battery power source, the present invention is novel, nonobvious, and useful. In a particular illustrative embodiment of the invention, the system and method assembling of connectors, switches, tubing, electrochemical cell materials, and wellbore casing (the final enclosure) creates a single subterranean borehole battery.

In a particular illustrative embodiment of the invention, a system and method for storage and withdrawal of electrical energy from a subterranean environment is disclosed. In a particular illustrative embodiment of the invention, design and conversion of oil and gas wells to utilize a better way for energy storage that matches the current goals and needs of the green energy revolution that we are currently experiencing via the installation of underground battery banks forming a borehole battery for use as energy storage. In the past, large footprint surface battery banks have often been used as an energy buffer to address both peak over demand from the nation's electric grid as well as non-peak output hours for wind and solar power generation. Surface batteries, however, have inherent risks associated with them. Surface batteries require a large footprint and are open to the outside environment if a hazardous chemical situation were to happen. Battery fires are an added risk for surface batteries. With battery banks stored safely underground, in wellbores, environmental concerns and surface footprint concerns are mitigated. Any potential hazardous components are contained in a polymer shell, inside sealed steel tubing, inside sealed steel casing with a cement sheath around it.

As oil and gas wells become depleted and reach their end of life, the depleted wells would normally become plugged and abandoned. Instead of plugging the well, there exists an opportunity to convert the wellbore into a battery for use in the electric grid. This is achieved by recycling the wellbore to be part of the battery's structural casing then manufacturing and installing individual battery cells in jointed or continuous tubing for final install into a wellbore. Multiple manufactured tubular shaped chemical battery cells would be installed stacked together in each wellbore with the electrical connections on each end of the batteries meeting either in series, in parallel, or in some combination thereof to achieve a workable or optimal voltage/amperage combination.

Figure 2:
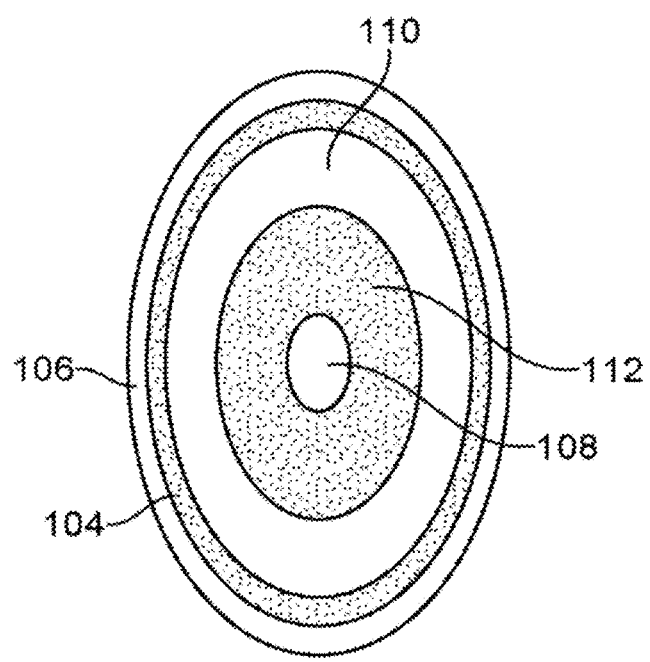
FIG. 2 depicts an end view of a cross section of a particular illustrative embodiment of the invention.

Turning now to FIG. 1 and FIG. 2, as shown in FIG. 1 and FIG. 2, in a particular illustrative embodiment of the invention, an example, a subterranean 4,800 feet deep well supports the installation of 120 battery cells, 40 feet long each, 1.5V per cell. In series the string of cells, (based on lead acid technology as an example), yields a theoretical 240V and roughly 5,260 Amp Hrs., or 1,260 kWh. If the average house uses 893 kWh/month of power, one converted well could store enough power to run a house for 1.4 months. Electrical energy stored in the subterranean well is subsequently withdrawn to power residential and industrial electrical equipment. As shown in FIG. 1, a battery cell end cap adjoins a battery cell end cap 102 protrudes from steel joint tubing 100. Battery cell polymer insulation 104 surrounds battery cell core 105 and is connected to a first end of a battery cell. A casing collar 106 is used to connect adjacent sections of steel jointed tubing 100 to form a borehole battery made up of multiple battery cells 102. FIG. 2 shows an end view of a cross section of the battery cell having an anode connection 110, a cathode connection 108, battery cell polymer insulation 104 and second insulator 112.

In a particular illustrative embodiment of the invention, the battery is not limited to a standard tubular rechargeable battery construction methods at its core. The battery core is wrapped in an electric insulator with conductive endcaps to allow transfer of power from one cell to the next. The sealed battery would then be installed into steel tubing commonly used in the oil and gas industry. The tubing joints are then installed into a vacated subterranean wellbore with low-cost conventional workover rigs or some other conveyance. The fit for purpose tubing joint collars are designed to hold the weight of the battery cells and transmit electrical current in either series or parallel configuration to the next cell. The subterranean battery would be integrated into the power grid for use.

Figure 3:
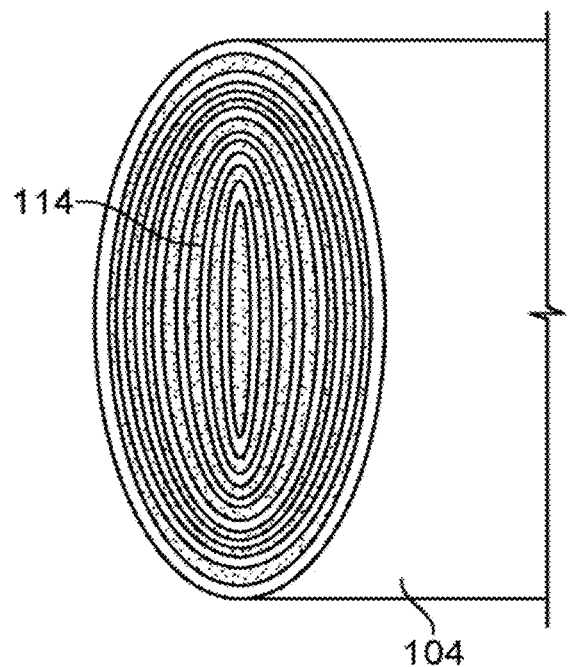
FIG. 3 depicts a perspective view of a particular illustrative embodiment of the invention.
Figure 4:
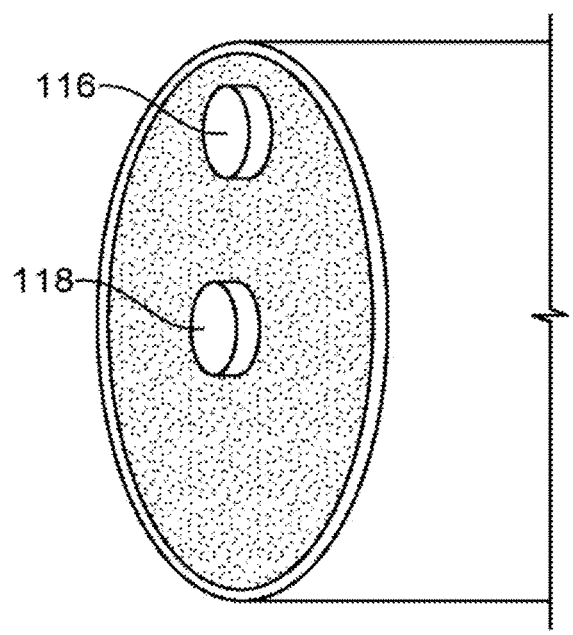
FIG. 4 depicts a perspective view of a particular illustrative embodiment of the invention wherein, each end of the cell will have a cap with two conductors to pass current along to the next cell.

Turning now to FIG. 3, FIG. 3 depicts a schematic representation a basic cutaway 114 of the proposed battery core. As shown in FIG. 3, a core, is manufactured separately and encased in an insulating polymer. Turning now to FIG. 4, as shown in FIG. 4, each end of the cell will have a cap with two conductors 116 and 118 to pass current along to the next cell and to a surface connector.

Figure 5:
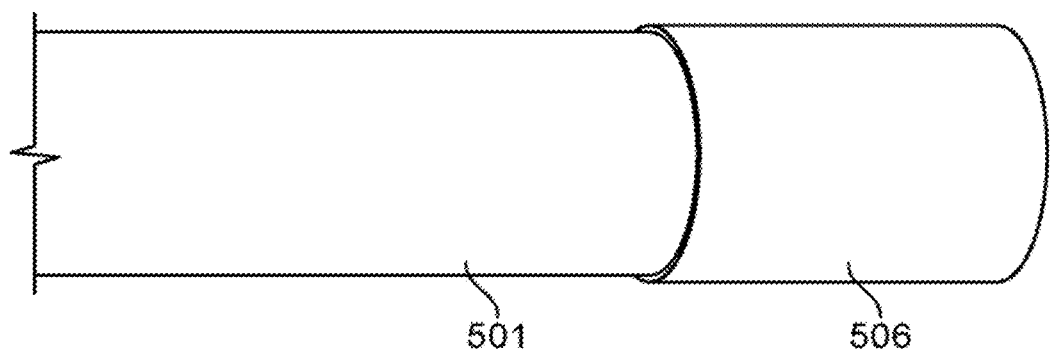
FIG. 5 depicts a side view of a particular illustrative embodiment of the invention wherein the entire cell will be installed into commodity oilfield grade steel tubing and will be connected with a specialized tubing collar.
Figure 6:
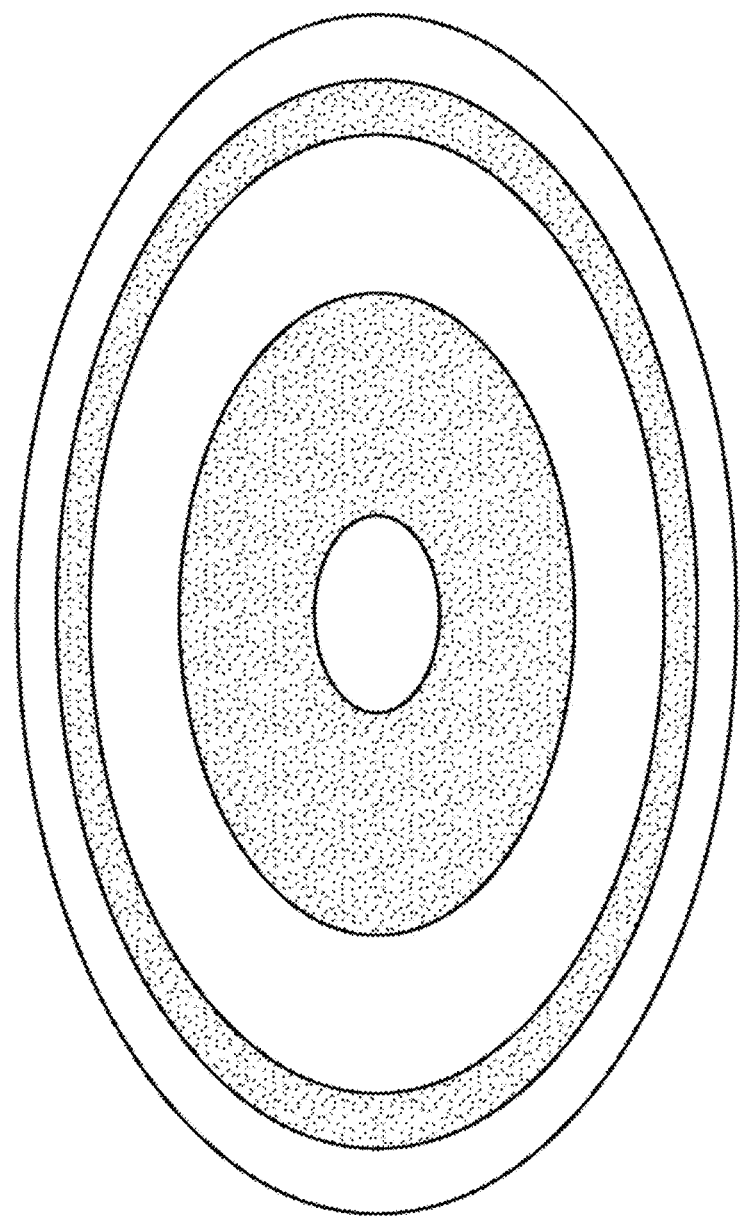
FIG. 6 depicts an end view of a cross section of a particular illustrative embodiment of the invention wherein each tubing collar will be designed to not only hold the weight of one cell in a vertical position but will have two conductive paths through it to interface with the power cell end caps.

Turning now to FIG. 5, as shown in FIG. 5, in another particular embodiment, the entire cell is installed into a commercially available, commodity oilfield grade steel tubing 501 and is connected with a specialized tubing section 506. Turning now to FIG. 6, As shown in FIG. 6, each tubing collar is designed to not only hold the weight of one cell in a vertical position but will have two conductive paths through it to interface with the power cell end caps. The collar is holding the weight of the individual cells contained within that piece of tubing but also a part of the structural component of the collective of all the connected strings of tubing.

Figure 7:
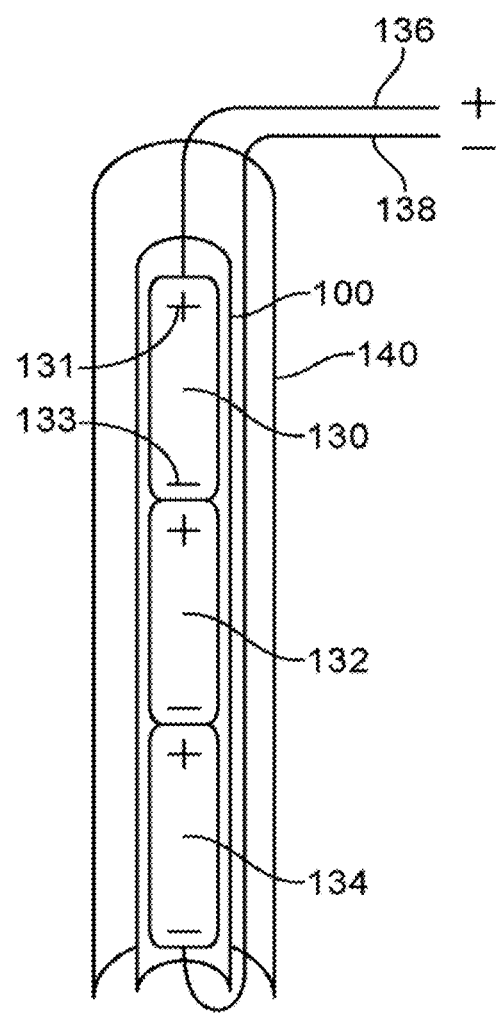
FIG. 7 depicts a side view of a cross section of a particular illustrative embodiment of the invention.

Turning now to FIG. 7, as shown in FIG. 7, battery cells 130, 132 and 134, each having a negative anode 133 end and a positive cathode 131 end are electrically connected in series to each other inside of tubing 100 in a wellbore 140 drilled in the earth in a subterranean environment. An electrical lead 138 is connected to negative anode 133 and an electrical lead 136 is connected to the positive cathode 131 of the borehole battery.

Figure 8:
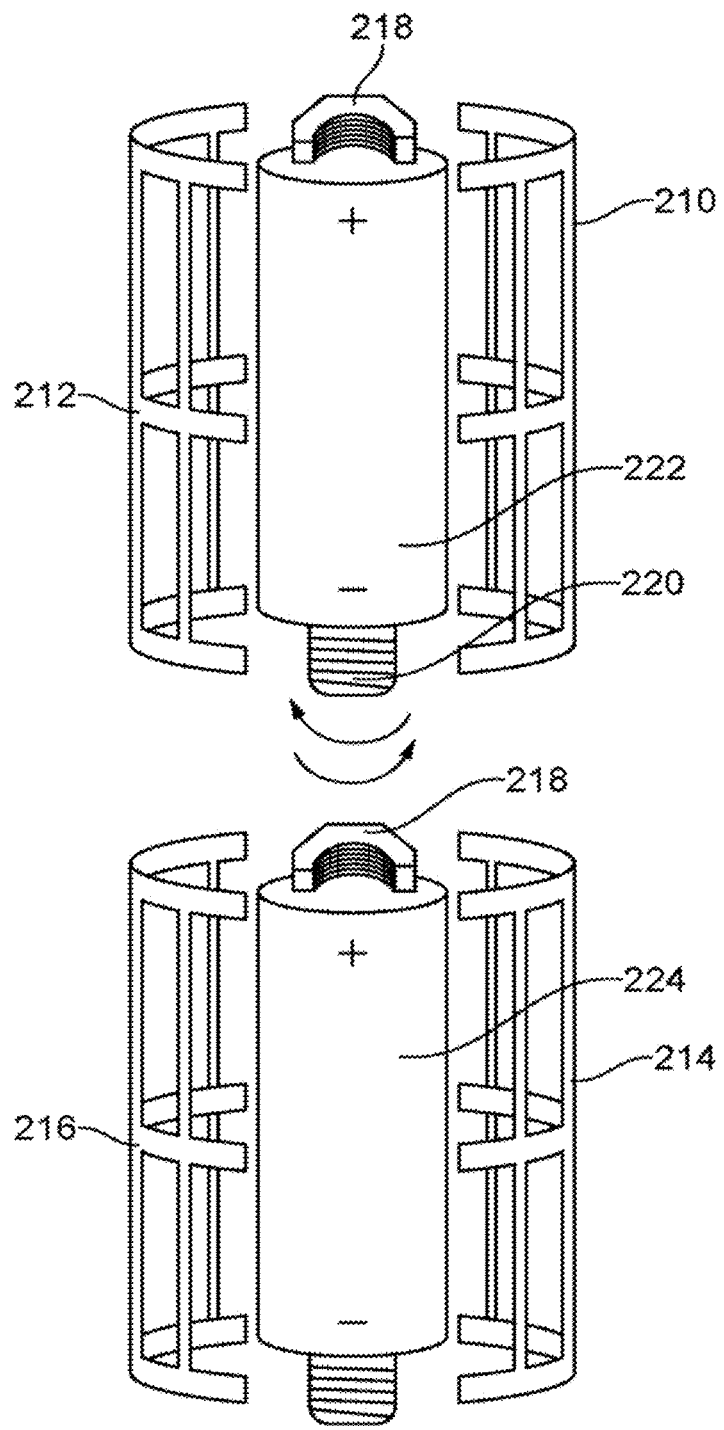
FIG. 8 depicts an exploded view of a particular illustrative embodiment of the invention.

Turning now to FIG. 8, as shown in FIG. 8, load bearing baskets 210 and 212 snap together around battery cell 222. Similarly load bearing baskets 214 and 216 snap together around battery cell 224. Each battery has a threaded female connector receptacle 218 and a threaded male connector 220. The threaded male connector 220 of battery cell 222 screws into the female threaded receptacle 218 of battery cell 224, forming a first section of the borehole battery. The battery cells are sliding into tubing 100 and deployed in a casing 101 into a wellbore 140.

Figure 9:
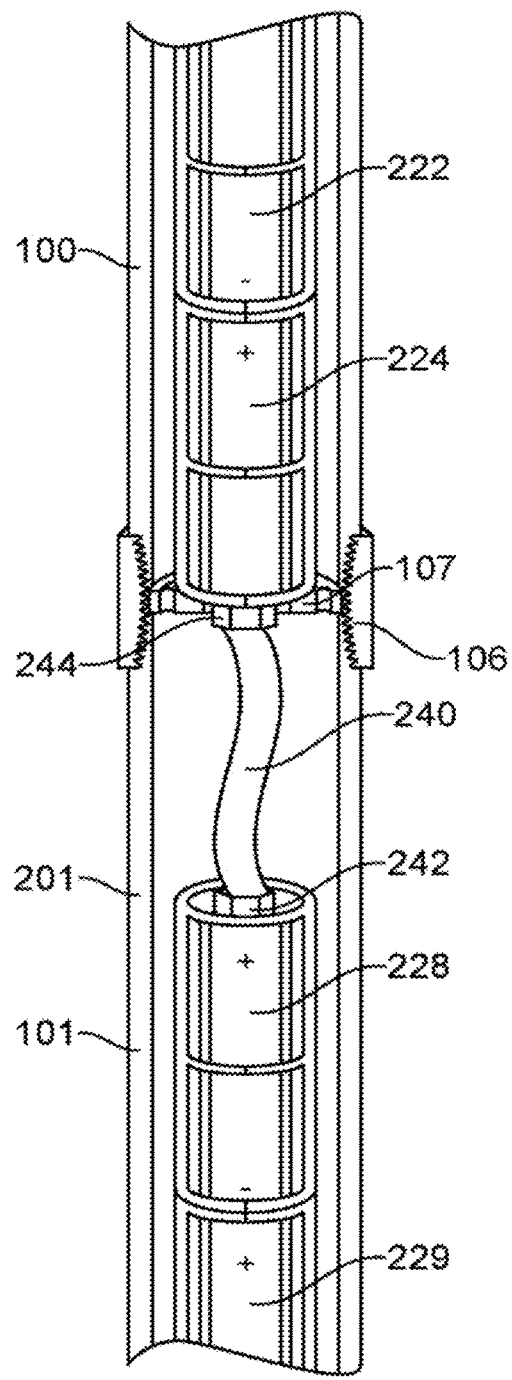
FIG. 9 depicts a side view of a cross section of a particular illustrative embodiment of the invention.

Turning now to FIG. 9, as shown in FIG. 9, battery cell 222 is connected to battery cell 224 inside of a first tubing section 100. A third battery cell 228 is connected to a fourth battery cell 229. The threaded male connector 220 of battery cell 229 screws into the female threaded receptacle 218 of battery cell 228, forming a second section of the borehole battery. A flexible electrical connector 240 is connected to the first battery section via connector 244 and to the second battery section via electrical connector 242.

Figure 10:
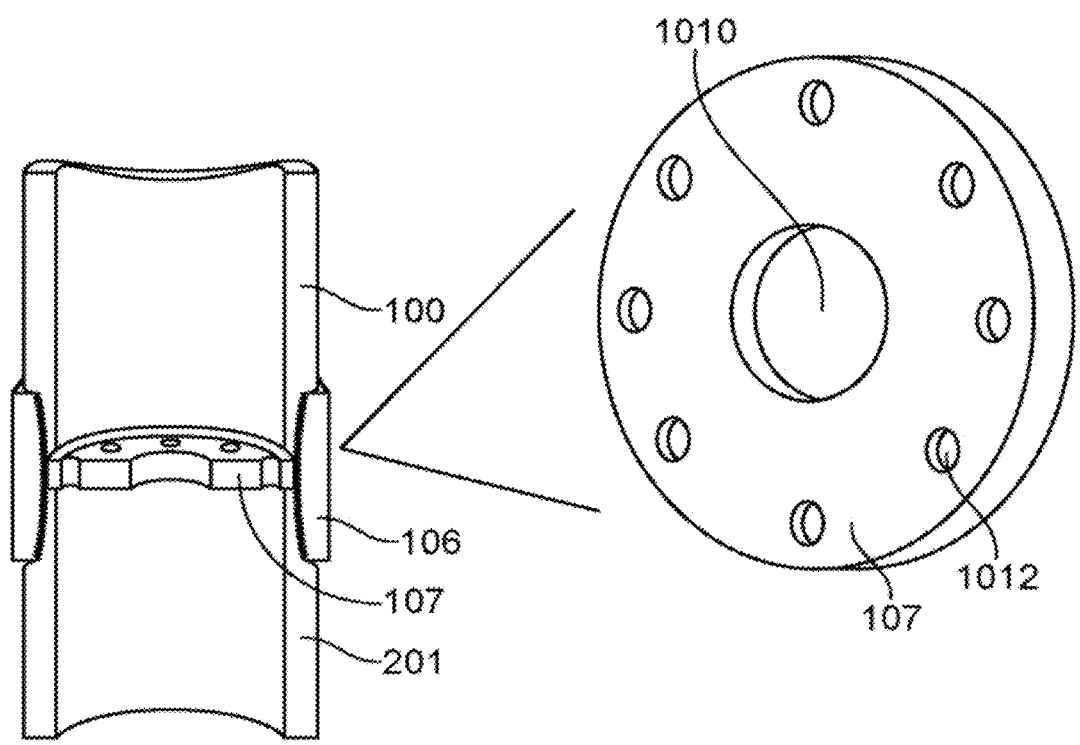
FIG. 10 depicts an exploded view of a particular illustrative embodiment of the invention.

Turning now to FIG. 10, as shown in FIG. 10, a steel plate 107 is inserted between a first tubing section 100 and a second tubing section 201. The steel plate 107 has 8 circumferential holes 1012 and a center hole 1010.

Figure 11:
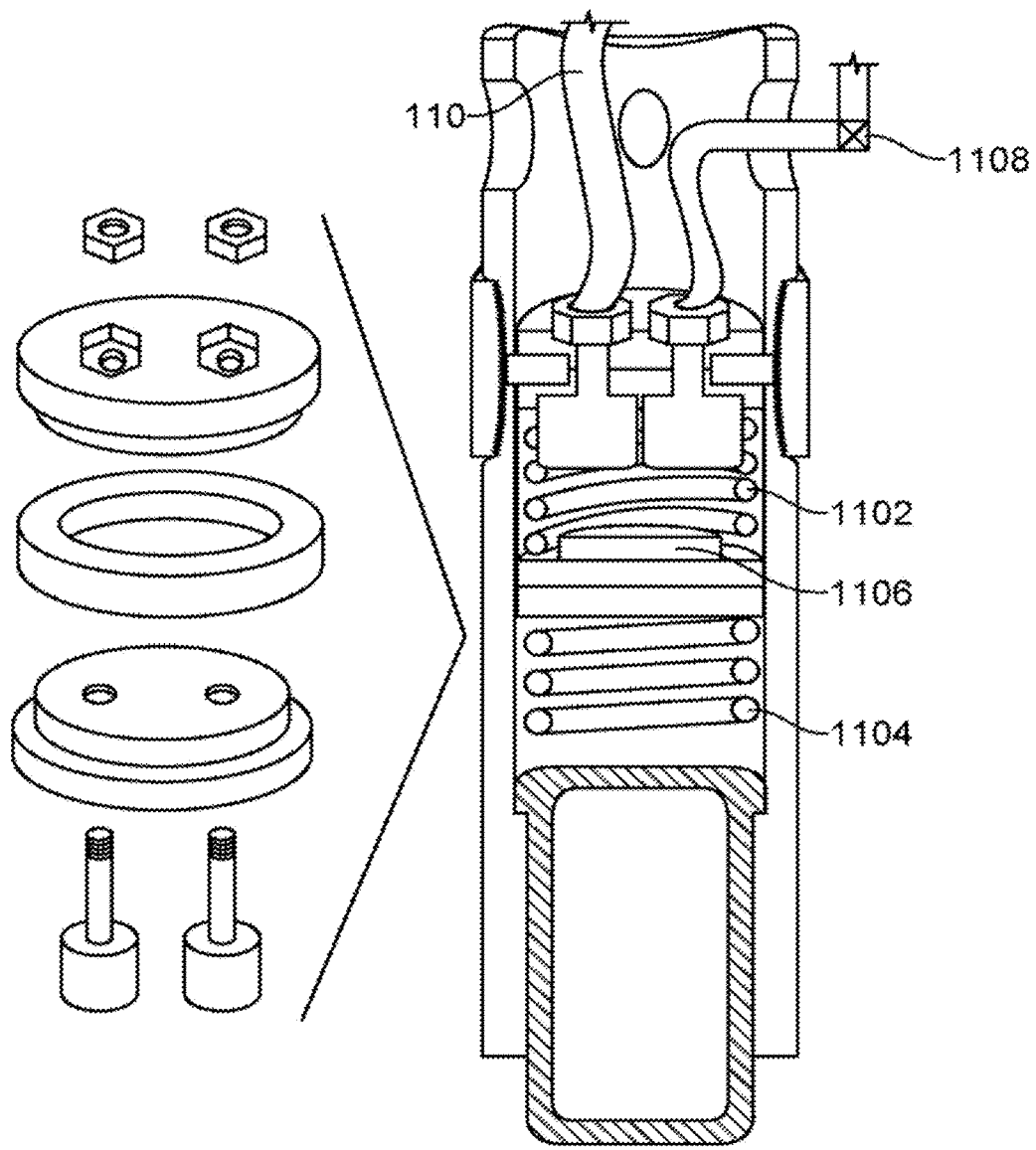
FIG. 11 depicts an exploded view of a particular illustrative embodiment of the invention.

Turning now to FIG. 11, as shown in FIG. 11, in a side cross-sectional view of a section of an illustrative embodiment of the invention. As shown in FIG. 11, a flexible connector 1110 connects lower battery cell to a pressure activated safety switch at the bottom of the borehole battery portion. The safety switch is a safety feature that only engages when the battery cell assembly is landed on bottom. This ensures the return conductor is not live as the battery cells are lowered into and out of the recycled battery casing housing. The way the pressure switch works is, as weight is put on the switch, partial string weight is transmitted to the switch contact points which then energizes the circuit.

A lower spring 1104 limits the force so as to not ruin the switch. Because there is only so much stroke on the bottom button, the spring force is all the contact points will see. The tubing edge will bottom out on the "Battery Cell Activation Landing Support" 1805 in FIG. 18, before the button 1106 bottoms out against the conductive contact points. The upper spring 1102 makes sure the safety switch electrically disengages when the borehole battery is pulled out of the well. This is an added safety feature to make sure the battery return conductor wire is not live as the batteries are disassembled while coming out of the battery casing. To figure the force needed for each of the upper spring and bottom springs, bottom spring=desired force on contacts when compressed+upper spring force when compressed upper spring=desired spring force when compressed, (just needs to be enough to make sure the switch deactivates when the string containing various internal components of the borehole battery is picked up and lifted out of the wellbore).

In another particular illustrative embodiment of the invention, the system and method repurpose jointed tubulars. Historically these jointed tubulars are used to aid in the circulation and flow of wellbore fluids in the wellbore. In another particular illustrative embodiment of the invention, the system and method convert the jointed tubulars for use as a battery housing when constructing a battery bank. The jointed tubulars are repurposed as a mechanism for connecting battery banks together in series in the wellbore.

Figure 12:
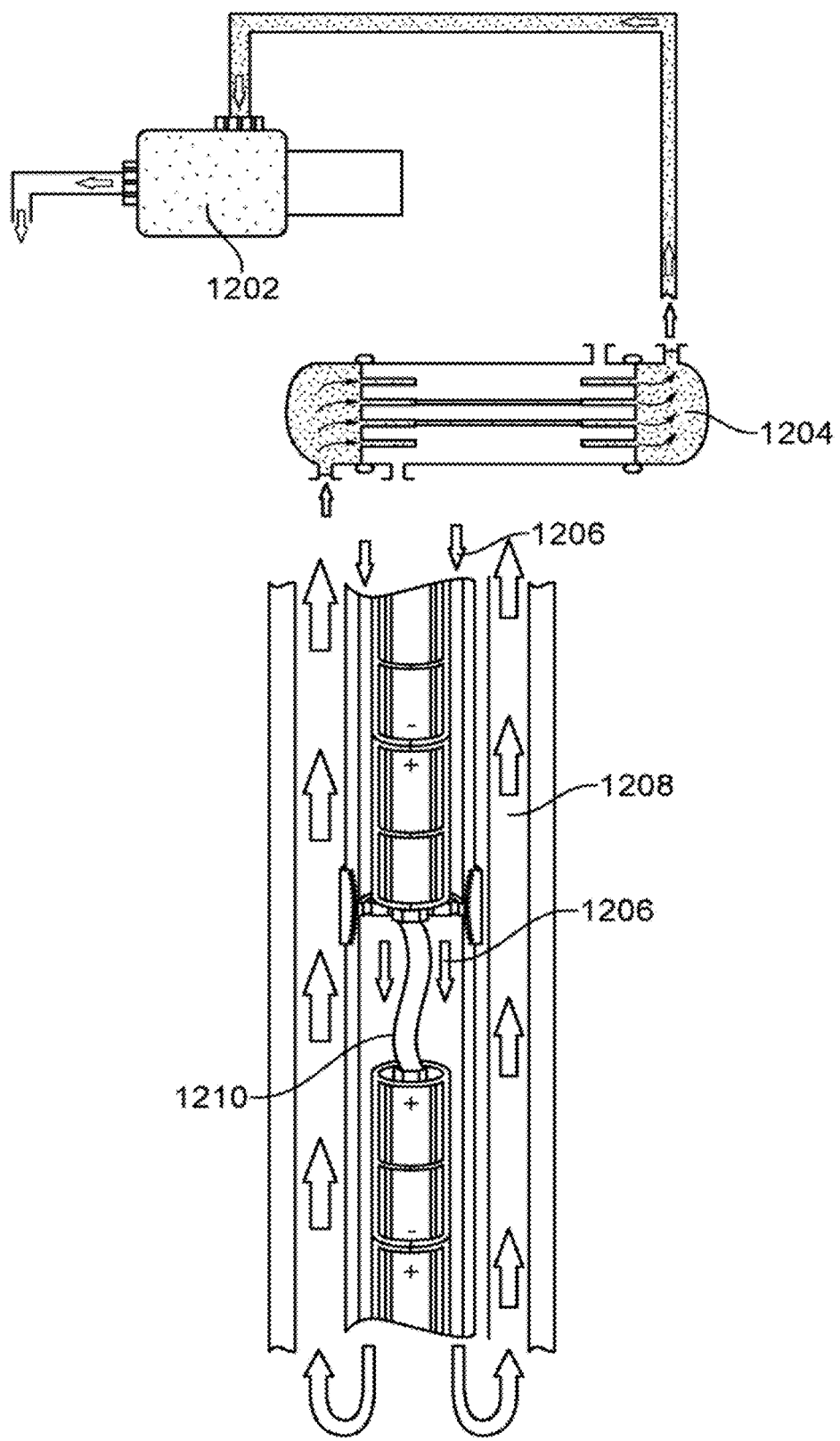
FIG. 12 depicts an exploded view of a particular illustrative embodiment of the invention.

Turning now to FIG. 12, in a particular illustrative embodiment of the invention, a cooling medium pump 1202 and heat exchanger 1204 are provided to pump a cooling medium, such as water or air or another cooling gas. The cooling medium is pumped into the borehole battery in downward flow path 1206 through an inner annulus formed between the battery cell and basket and an interior surface of the tubing 100, wherein the cooling medium flows through the inner annulus across the borehole battery cells throughout the borehole battery and returns through the outer annulus in flow path 1208 formed between the exterior surface of the tubing 100 and the interior surface of casing 101, to the heat exchanger where the cooling medium is cooled and returned to the pump 1202 for recirculating through the borehole battery. The casing 101 is inserted into a sealed interval of the wellbore 140. Power is provided to the surface of the wellbore (e.g., above the wellbore 140 of FIG. 18.

Figure 13:
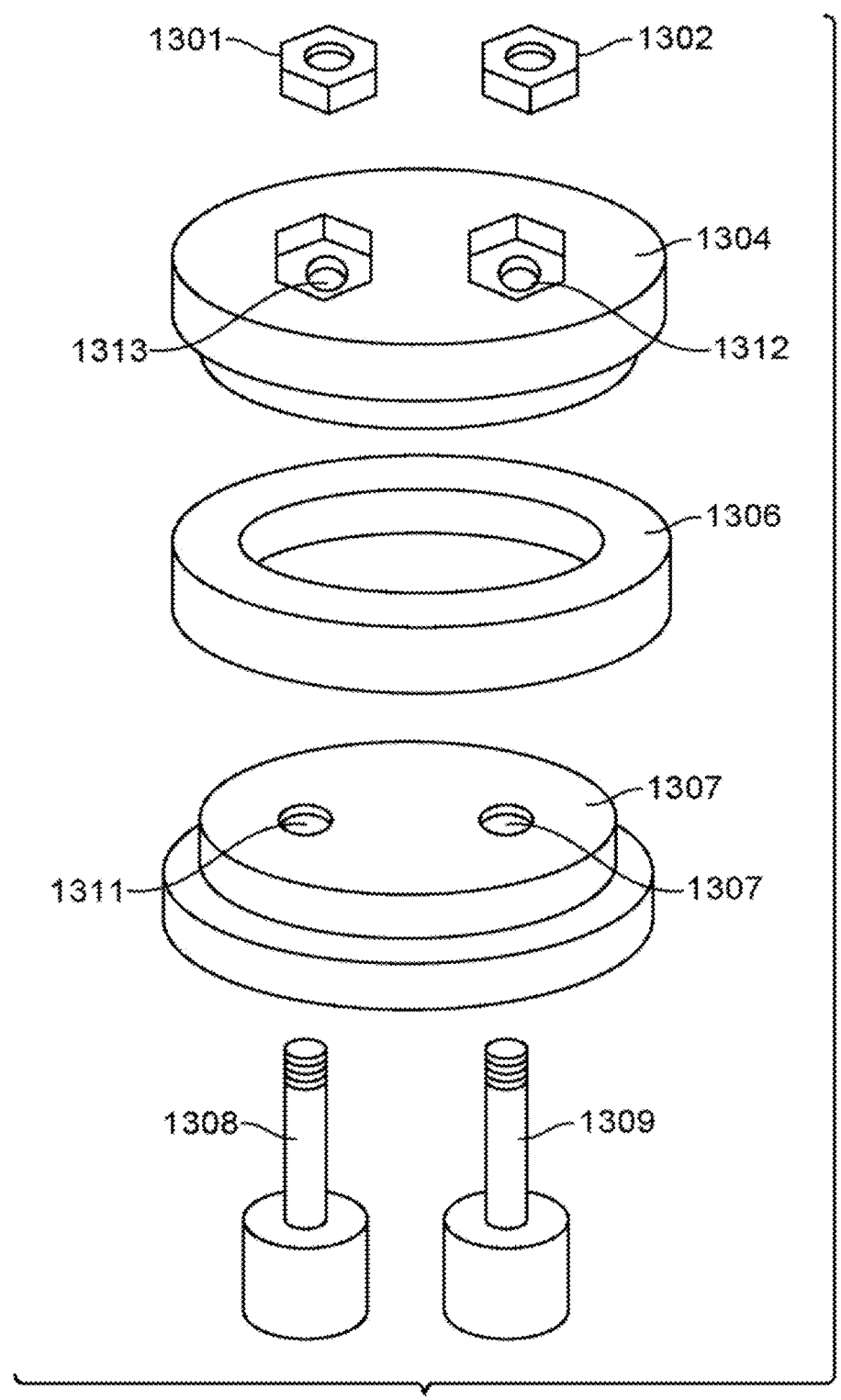
FIG. 13 depicts an exploded view of a particular illustrative embodiment of the invention.

Turning now to FIG. 13, as shown in FIG. 13, in a particular illustrative embodiment of the invention two threaded fasteners 1301 and 1302 fit into a first dielectric insulator 1304. First dielectric insulator 1304 fit into a top of steel ring 1306. Second dielectric insulator 1307 fit into a bottom of steel ring 1306. Conductive lugs 1308 and 1309 fit through holes 1311 and 1310 in second dielectric insulator 1307 and holes 1313 and 1312 in first dielectric insulator and are threaded into threaded fasteners 1301 and 1302.

Figure 14:
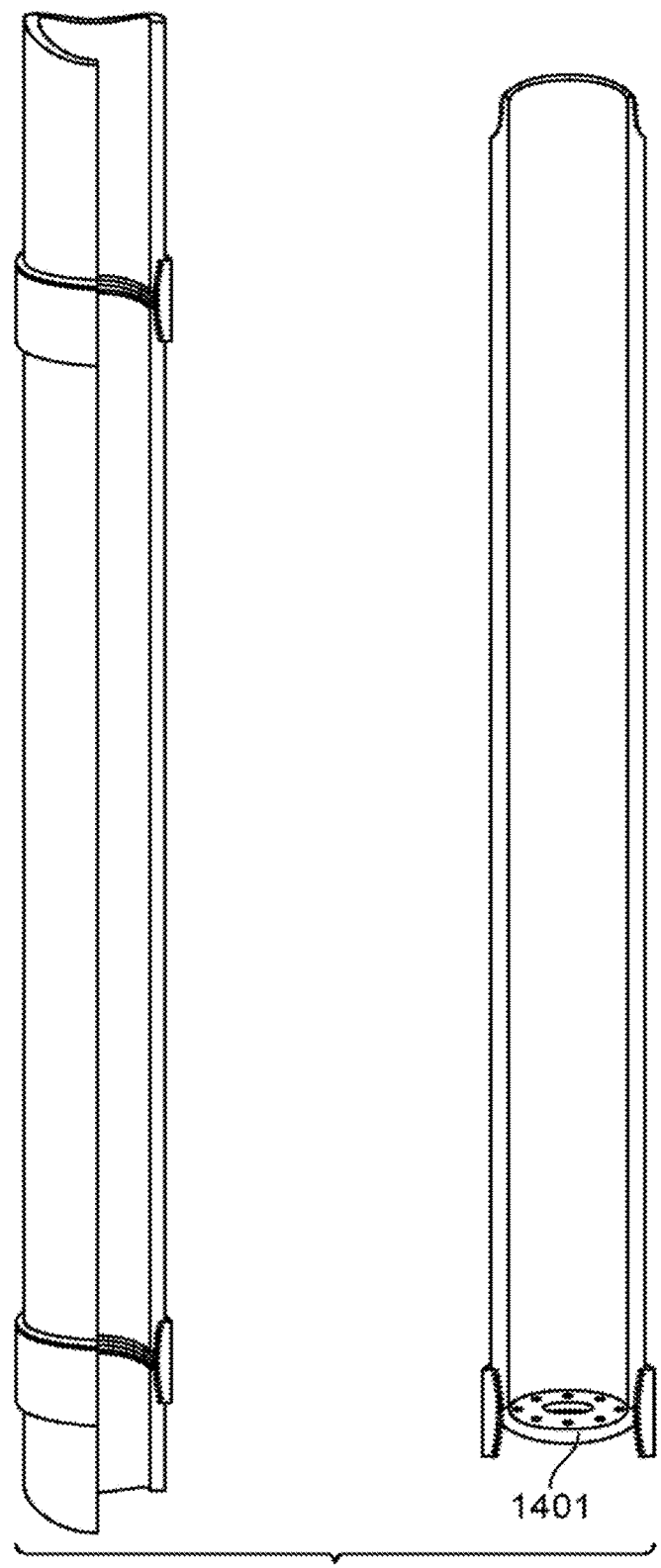
FIG. 14 depicts a side view of a cross section of a particular illustrative embodiment of the invention.

Turning now to FIG. 14, in a particular illustrative embodiment of the invention, a jointed tubing is connected to the borehole battery. The battery cell tubing (the tubing containing the battery cells) is connected to another section of tubing using a threaded battery cell tubing connector.

Figure 15:
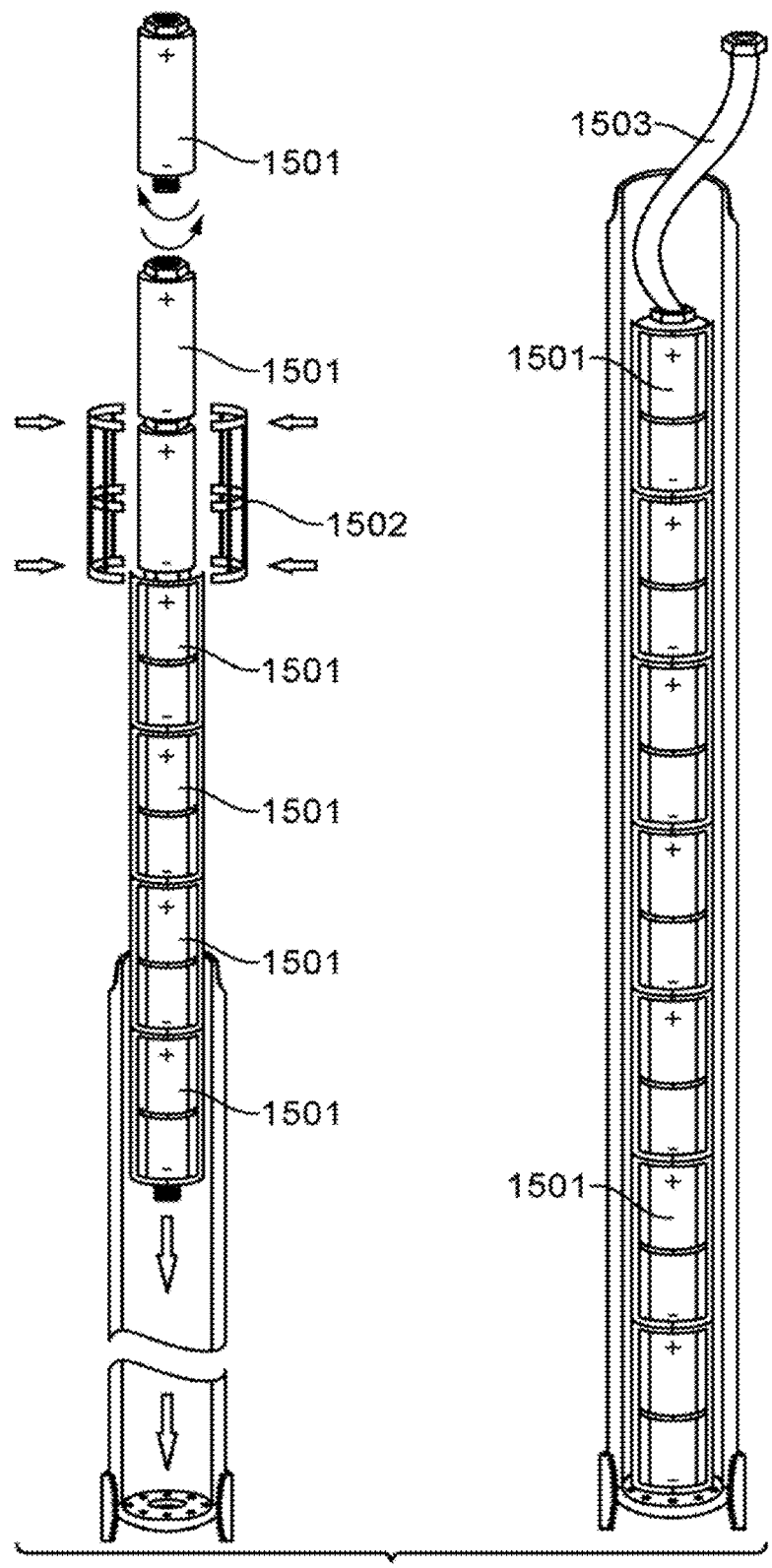
FIG. 15 depicts a side view of a cross section of a particular illustrative embodiment of the invention.

Turning now to FIG. 15, in a particular illustrative embodiment of the invention, battery cells 1501 are screwed together to provide the multiple connected battery cells that make up the borehole battery. Load bearing baskets 1502 are snapped together to protect the battery cells 1501 and to provide the cooling path for the cooling medium that is pumped down into the borehole battery. A flexible connect pigtail provides an electrical connection to the top of the borehole battery made up of the multiple battery cells. At the surface of the wellbore, a flexible connector connects to the top of the borehole battery and provides access to electricity to a surface equipment, such as a residence for heating and cooling.

Figure 16:
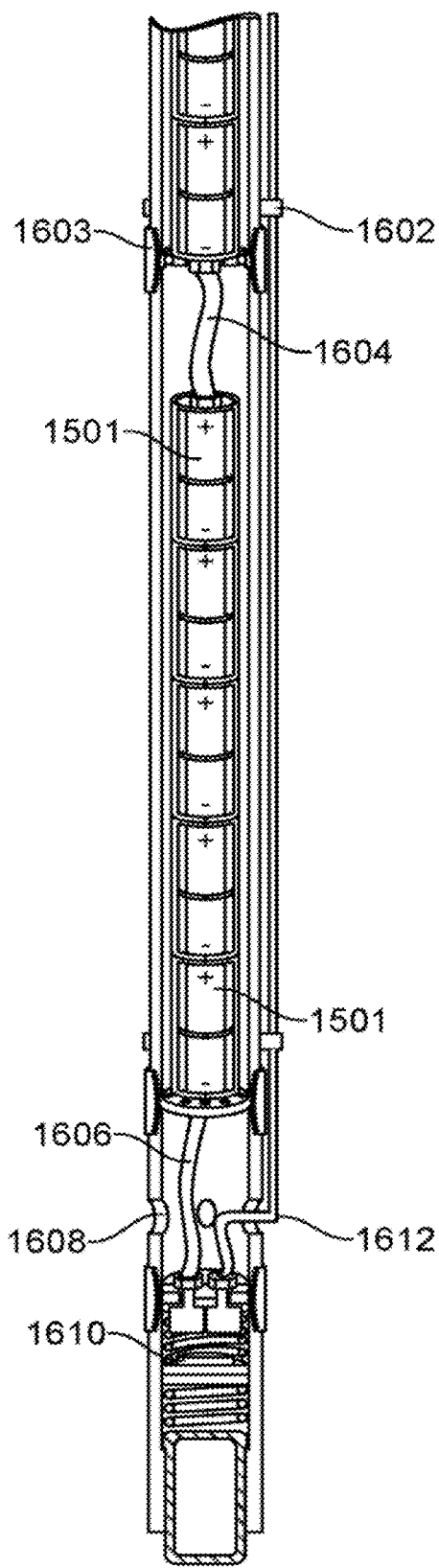
FIG. 16 depicts a side view of a cross section of a particular illustrative embodiment of the invention.

Turning now to FIG. 16, in a particular illustrative embodiment of the invention, as shown in FIG. 16, groups of battery cells 1501 contained within a single tubing section are joined together using a connector 1603. Each group of battery cells within a single tubing section are electrically connected with a flexible pigtail 1604. A bottom section of tubing containing a group of battery cells 1501 are connected to the pressure activated switch 1610. A plurality of cooling medium circulation holes 1608 provides a return path for the cooling medium after it passes down through casing sections past the battery cells. The cooling medium returns to the surface to the heat exchanger where it is cooled and recycles by the cooling pump. An electrical connection return conductor wire 1612 is connected to the pressure activated switch. The return conductor wire 1612 is banded to the external surface of the casing sections. The pressure activated switch is normally held in an open circuit position by the upper spring. When the weight of the battery is placed on the retainer, the upper spring is compressed and the pressure activated switch is placed in a closed-circuit position. This way the battery is not energized until the battery is in place on the retainer.

Figure 17:
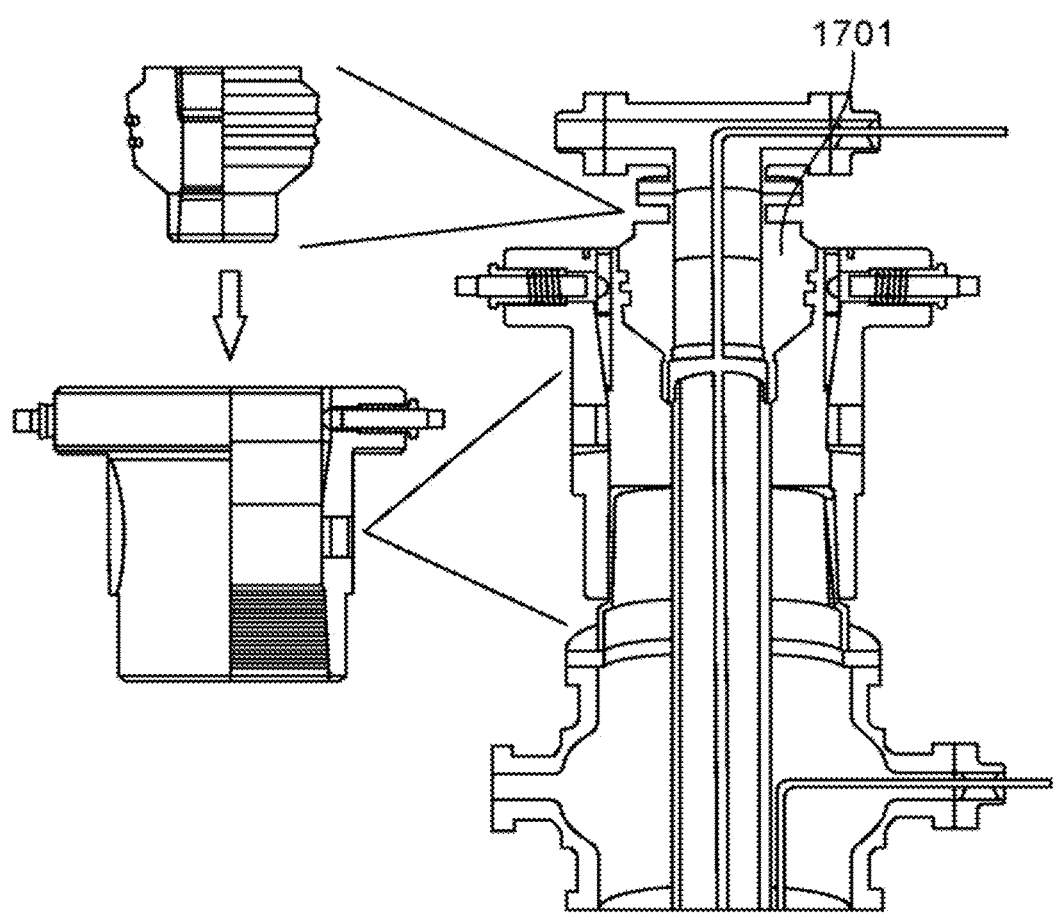
FIG. 17 depicts a side view of a cross section of a particular illustrative embodiment of the invention.
Figure 18:
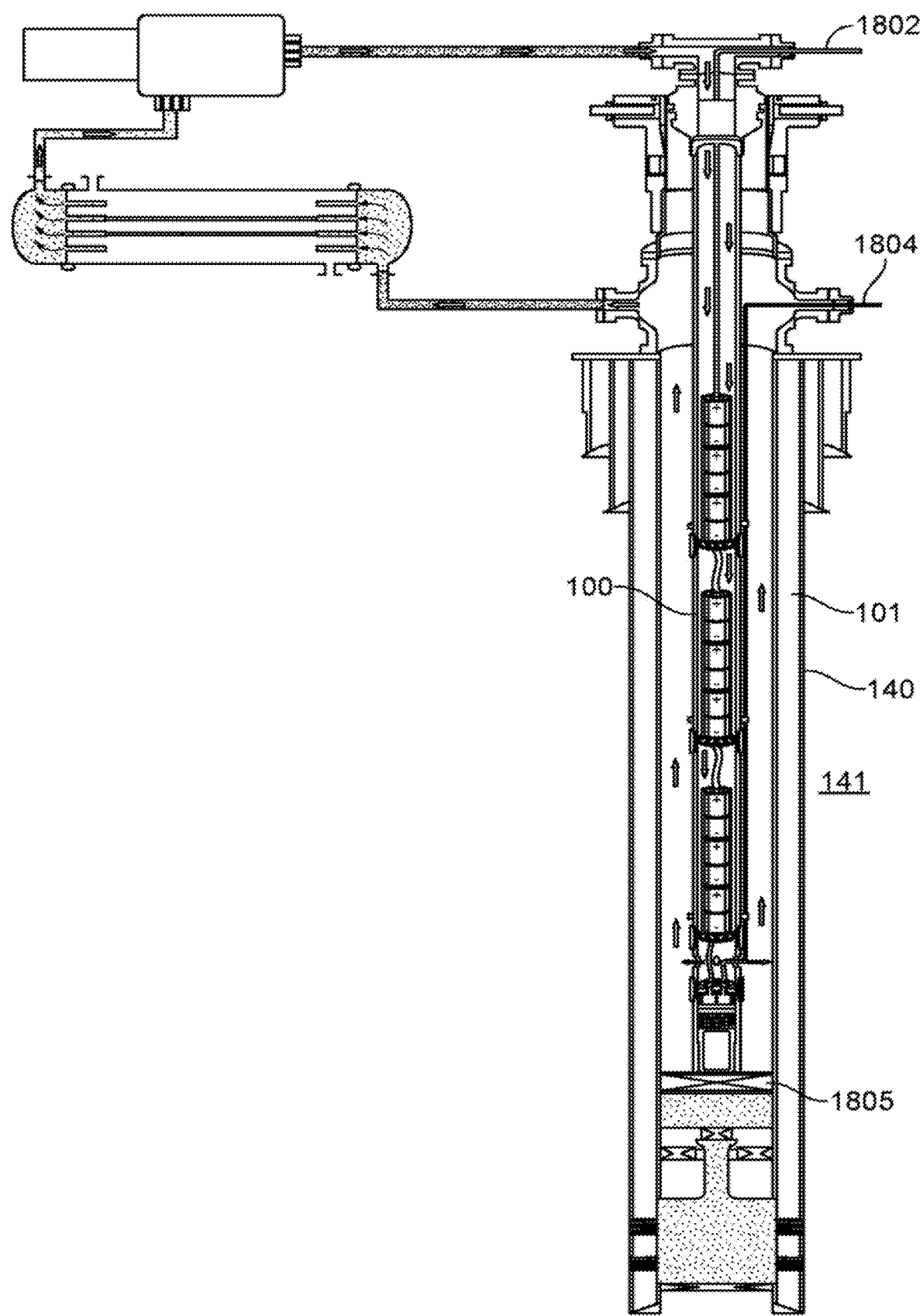
FIG. 18 depicts a side view of a cross section of a particular illustrative embodiment of the invention.

Turning now to FIG. 17, in a particular illustrative embodiment of the invention, the borehole battery is installed in tubing and suspended from a tubing hanger 1701. Turning now to FIG. 18, in a particular illustrative embodiment of the invention, a conductor 1802 is provided from the top cathode of the borehole battery at the uppermost battery cell group. A conductor 1804 connects the anode side of the borehole battery to surface equipment on the surface of above the wellbore 140 drilled into the Earth 141. The wellbore battery rests on a retainer 1805.

In another particular illustrative embodiment of the invention, the system and method are used to rep pose a wellhead tubing hanger. Historically wellhead tubing hangers are used to hang off tubing for hydrocarbon flow from a wellhead. In a particular illustrative embodiment of the invention, the system and method the wellhead tubing hanger is repurposed to hang off storage batteries, battery connectors, battery safety switches, and power lines from the converted well.

In a particular illustrative embodiment of the invention, the system and method are integrated with an existing electrical grid currently used for one way distribution at the well site and converted to both input and output of electricity. In a particular illustrative embodiment of the invention, a workover rig is used to install these batteries, whereas the workover rig would traditionally be used to uninstall and reinstall tubing used to circulate and extract hydrocarbons.

In a particular illustrative embodiment of the invention, the system and method create a new use for a post plugged and abandoned wellbore. Moreover, the system and method repurpose existing resources to fulfill a new unintended use. The system and method repurpose a wellbore, tubing, field footprint and the electric grid.

In a particular illustrative embodiment of the invention, the system and method produce a cheaper ay to store electron energy in batteries. The system and method create a safer grid that is less accessible and thus provides and inherent deterrent to provide a terrorism defense. The system and method also provide environmental protection, wherein if a battery leaks, it leaks into a sealed environment within the wellbore, sealed inside tubing, inside the wellbore casing, sealed inside cement, inside another layer of casing and cement downhole in the wellbore. In a particular illustrative embodiment of the invention, the system and method help stabilize energy demand associated with renewable resources and provide current oil and gas producers a way to diversify away from their hydrocarbon collection.

In a particular illustrative embodiment of the invention, the system and method are used as in the following example. Initially the system and method of the present invention are used to prepare the wellbore for conversion into a borehole battery. An obsolete hydrocarbon wellbore is earmarked for conversion. The earmarked wellbore is then evacuated of all production equipment and abandoned as per state/federal guidelines to a depth that would be adequate for conversion, usually around 5,000'. This process is completed with an oil and gas workover rig. Evacuated components are disposed of as per regulatory guidelines. A combination cement and bridge plug/cement retainer are installed at the new plugged back total depth. A pressure integrity test is performed on the newly plugged back wellbore to verify wellbore integrity. A bridge plug is installed that is adequate for set down weight on top of the cement retainer. A workover string is installed into the wellbore, tagging the bottom for wellbore fluid evacuation. Nitrogen or air is pumped into the wellbore as to evacuate the wellbore fluid and blow dry the wellbore as practical. The workover string is removed.

In a particular illustrative embodiment of the invention, the system and method are used to build the battery of multiple connected battery cells or battery bank sticks, also referred to herein as battery sticks, which are formed by a plurality of battery cells joined together physically and electrically. Battery sticks of the appropriate length, outside diameter, voltage, and capacity are manufactured off site through a $3^{rd}$ party contractor. Battery sticks are manufactured with positive engagement endcaps, so as to be securely fastened together end to end, (example: such as thread together connectors).

Cells are attached end to end in a series or parallel configuration to match a joint of tubing, (ex: 10', 15', 40', etc). Plastic stabilizing baskets or cages 210, 212, 214 and 216 are provided which encapsulate each cell in order to provide axial & radial stress support, to allow return cooling medium and air flow around the battery cells, and to protect the cell connectors from shock forces. The cells can be shrink wrapped together with electrically insulating heat shrink for stability and ease of installation. The cells are pushed into each joint of tubing, leaving approximately a foot of space at the up-hole side of the tubing.

The tubing connectors provide a combination of tubing-to-tubing connectivity, vertical battery weight support, string ventilation, and battery connectivity from tubing string to tubing string. A down hole end of the tubing uses a flexible connector that incorporates a screw in style connection piece to link battery connectivity across the tubing connections. An up-hole end of the tubing use the same flexible connector. A flexible pig tail is provided that threads through the tubing connector so as to allow the battery bank sticks to connect to together before the battery sticks are screwed together with the tubing collar. This flexible pig tail will secondarily allow for tubing stretch and thermal expansion of the tubing during installation and service life.

In a particular illustrative embodiment of the invention, the system and method provide a Secondary Battery Cooling line. Air is circulated by pumping through the battery sticks, and across each individual battery to cool the batteries while in use. This process is part of the design facilitated via the ventilated tubing collar connector plates. Air is circulated either down the tubing and up the annular space, or vice versa. If the wellbore annular space is required to be sealed from the tubing ID, (ex: flooded wellbore), a secondary cooling line can be installed into the bottom pressure switch connector. This secondary cooling line will be used to circulate air or a dielectric cooling fluid across the battery tubing body for cooling. Install an approximately 1-inch capillary line, or jointed tubing is installed into the wellbore. This secondary cooling line installed during the primary installation of the battery string and should be banded to the tubing along with the return conductor wire.

In a particular illustrative embodiment of the invention, the tubing connectors are a cylindrical plate of steel 107 that is sandwiched between the tubing joints 100, 201, (501, 506), inside the tubing connection collar. The cylindrical plate 107 has a hole 1010 in the middle to accommodate the flexible pig tail connector, and holes 1012 on the perimeter to accommodate forced air circulation for cooling. The cylindrical plate is manufactured with an insulative, rubberized coating.

In a particular illustrative embodiment of the invention, battery bank sticks made up of multiple connected battery cells, are installed in preferably 40' intervals maximum, lowering the battery sticks into the wellbore in series to rest on the retainer that sits at the well's plugged back depth. The bottom has an electrical connector 1108 that fits an external line to be strapped to the outside of the tubing and run to surface. The bottom has a pressure activated switch to energize the system when set down weight is achieved. The system and method are used to attach the landing pup to the bottom joint, over the electrical connector.

In a particular illustrative embodiment of the invention, the system and method are used to make up each joint. While making up each joint, each joint is preferably verified with a multimeter for electrical integrity. The joints arrive with the batteries preinstalled with the down hole connection made up and ready. The up-hole connection has a flexible pigtail connector 1110 that should not need to be pre-rotated before installation. The number of turns to connect the inner connection should be the same number of turns for the outer connection in the opposite direction, leaving the pigtail in a neutral position after installation.

In a particular illustrative embodiment of the invention, each battery stick will have an external banding point for the external electrical wire ran to surface. Do not damage the electrical insulation of the wire. A pup joint is provided as a final termination joint to finalize and space out the final set down weight on the bottom hole retainer. A pup joint is a short casing or tubing used for handling production tubing assemblies and for spacing out full length tubing and casing strings. The system and method are used to set stall a tubing hanger wellhead assembly to hang off the battery bank. The system and method are used to space out and connect the electrical connection to the surface equipment, utilizing a high voltage disconnect switch. Ensure the switch is disengaged. The system and method are used to hang tubing in the wellhead from the tubing hanger. Final set down weight of the tubing is determined to minimize tubing stretch while allowing for thermal expansion. As set down weight is achieved, the bottom hole switch is activated and the battery pack circuit is energized and live, ready to supply electrical power to a surface user, such as a home.

In a subterranean environment, electrical energy is converted to chemical energy through the flow of electrons from one electrode to another through an external subterranean circuit. The chemical energy is stored and converted back to electrical energy as needed for surface use. The system and method are used to transfer power into the subterranean cells so as to charge the batteries through a surface connection and power source; store power for a period of time; extract power as required to the surface through the use of power transformers or other surface equipment connected to surface transmission lines.

In a particular illustrative embodiment of the invention, battery cells in a wellbore can be wired in series, parallel, or a combination thereof. Consider the following, an example wellbore to be converted to battery bank storage: Wellbore: Casing: 7" OD, 6.276" ID, 5,600' deep; Battery string: Host Install Tubing: 3½" OD, 2.992" ID; Tubing connection: 5" OD, 1' long battery cells, 5,600 batteries total. In a particular illustrative embodiment of the invention, the batteries are lithium technology, 3.6V each, 20,160V total system, 3.25" OD batteries, yields a theoretical 1,730 kWh. This is enough to power the average house for almost 2 months. In a particular illustrative embodiment of the invention, a return conductor wire is provided which is a commodity "highline grade" aluminum alloy, OD: 0.5" and adequate for ~1,200 amps at 20,160V.

In a particular illustrative embodiment of the invention, clearances are maintained as follows Wellbore ID: 6.276" ID, Tubing connector: 5" OD, Return wire: 0.5" OD, Battery Assembly OD=Tubing connector+Return wire=5.5" OD, Wellbore-battery installation clearance=6.276"–5.5"=0.776" of install clearance. In a particular illustrative embodiment of the invention, casing integrity calculations are used, wherein in the wellbore that is to be evacuated, a collapse pressure of casing needs to be higher than the hydrostatic pore pressure of the formation, hydrostatic pressure differential at plug back total depth: 0.052×5,600'×8.34 ppg=2,429 psi. A casing Collapse Pressure Limit, 7" 26 #N-80 casing=5,410 psi.

In a particular illustrative embodiment of the invention, a subterranean energy storage and retrieval system is disclosed, the system includes but is not limited to, a wellbore; battery cells placed in the wellbore; and an electrical connection attached to the battery cells at a surface of the wellbore. In another particular illustrative of the invention, the subterranean energy storage and retrieval system the battery is a plurality of battery cells. In another particular illustrative of the invention, the subterranean energy storage and retrieval system further includes but not limited to a cooling system that circulates a cooling medium to and from the battery downhole.

In another particular illustrative of the invention, the subterranean energy storage and retrieval system further includes but not limited to an inner annulus formed between an outer surface of the battery cells and an inside surface of a tubing string, wherein the inner annulus provides a flow path for cooling medium circulated by a cooling pump. In another particular illustrative of the invention, the subterranean energy storage and retrieval system further includes but not limited to a wellbore casing, wherein the battery cells are placed inside of the wellbore casing; and an outer annulus formed between an outer surface of the battery cell tubing string and an inside surface of the wellbore casing, wherein the annulus provides a flow path for cooling medium circulated by the cooling pump.

In another particular illustrative of the invention, the subterranean energy storage and retrieval system further includes but not limited to a length of tubing placed in the wellbore, wherein the battery cells are placed in the tubing, wherein an outer annulus is formed between an outside diameter of the tubing and an Inside diameter of a wellbore casing and an inner annulus is formed vertically around a battery cell outside surface and the inside surface of the tubing, wherein the cooling system pumps the cooling medium downhole through the inner annulus to the batteries and the cooling medium returns through the outer annulus.

In another particular illustrative of the invention, the subterranean energy storage and retrieval system further includes but not limited to a pressure activated switch attached to a bottom of the battery; and an upper spring, wherein the pressure activated switch is held in an open circuit position by the upper spring, wherein the upper spring makes sure the pressure activated switch disengages when the battery is pulled out of the wellbore causing a weight of the battery to be removed from the upper spring in the pressure activated switch, wherein the switch is engaged to a closed position when the upper spring is compressed by a weight of the battery when the battery is lowered onto a retainer in the wellbore compressing the upper spring. In another particular illustrative of the invention, the subterranean energy storage and retrieval system further includes but not limited to a lower spring placed between the upper spring and the retainer, wherein a combination of forces of the upper spring and the lower spring limits the force on the pressure activated switch. In another particular illustrative of the invention, the subterranean energy storage and retrieval system further includes but not limited to a polymer shell surrounding the battery.

In another particular illustrative of the invention, the subterranean energy storage and retrieval system further includes but not limited to a plurality of end cap connectors on each end of each battery cell, wherein the battery cells are connected electrically to each other through the end cap connectors; and a threaded end cap connector wherein adjacent end caps mechanically fastened to each other using the threaded end cap connectors. In another particular illustrative of the invention, the subterranean energy storage and retrieval system further includes but not limited to a load bearing basket surrounding the battery cells, wherein the load bearing baskets snap together around the battery cells and provide a cooling medium flow path around the battery cells. In another particular illustrative of the invention, the subterranean energy storage and retrieval system further includes but not limited to a cylindrical tubing connection that connects the battery to a tubing section, wherein a cylindrical tubing connector has a middle hole for an electrical connection and a plurality perimeter holds for a cooling medium path. In another particular illustrative of the invention, the subterranean energy storage and retrieval system further includes but not limited to holes in the pressure activated switch that provide a return flow path for the cooling medium.

In another particular illustrative of the invention, the subterranean energy storage and retrieval system further includes but not limited to a wellbore; a sealed interval in the wellbore; a tubing, wherein a battery cell is placed inside the tubing in the sealed interval in the wellbore; a casing, wherein the tubing is place inside of the casing in the sealed interval in the wellbore; and an electrical connection attached to the battery at a surface of the wellbore. In another particular illustrative of the invention, the subterranean energy storage and retrieval system further includes but not limited to a cooling system that circulates a cooling medium to cool the battery; and a flow path for the cooling medium that enables the cooling system to pump the cooling medium across the battery and return to the surface.

In another particular illustrative of the invention, the subterranean energy storage and retrieval system further includes but not limited to an inner annulus formed between an exterior surface of the battery cells and the inner surface of the tubing; and an outer annulus formed between an outside of the tubing and an inside diameter of the casing, wherein the cooling system circulates a cooling medium from a surface of the wellbore through the inner annulus, wherein the flow path is formed by the inner annulus and the outer annulus. In another particular illustrative of the invention, the subterranean energy storage and retrieval system further includes but not limited to a bottom hole retainer in the wellbore; and a pressure activated switch at a bottom of the tubing, wherein the pressure activated switch is disengaged until the tubing final set down weight is resting on the bottom hole retainer.

In another particular illustrative of the invention, the subterranean energy storage and retrieval system further includes but not limited to a sealed interval in the wellbore, wherein battery cells are placed within the sealed interval. In another particular illustrative of the invention, the subterranean energy storage and retrieval system further includes but not limited to a method, the method including but not limited to sealing an interval in a wellbore; placing borehole battery cells within the sealed interval in a wellbore; activating a pressure activated switch tubing string battery cell assembly using the weight of the string to activate the pressure activated switch; and extracting electrical energy from the battery at a surface of the wellbore. In another particular illustrative of the invention, the subterranean energy storage and retrieval system further includes but not limited to circulating a cooling medium through an inner and outer annulus flow path to flow the cooling medium past the battery.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

Certain specific embodiments of methods, structures, elements, and parts are described below, which are by no means an exclusive description of the inventions. Other specific embodiments, including those referenced in the drawings, are encompassed by this application and any patent that issues therefrom.

The invention claimed is:

1. A subterranean energy storage and retrieval system, the system comprising:
   a wellbore including a wellbore casing;
   a length of tubing disposed within the wellbore casing;

one or more battery cells installed within the length of tubing; and an electrical connection attached to the one or more battery cells and extending to a surface of the wellbore, wherein the length of tubing isolates the one or more battery cells from an interior of the wellbore casing.

2. The subterranean energy storage and retrieval system of claim 1, further comprising:
a cooling system that circulates a cooling medium to and from the one or more battery cells downhole.

3. The subterranean energy storage and retrieval system of claim 2, wherein an inner annulus is formed between an outer surface of the one or more battery cells and an inside surface of the length of tubing, wherein the inner annulus provides a flow path for the cooling medium circulated by a cooling pump of the cooling system.

4. The subterranean energy storage and retrieval system of claim 3, further comprising:
an outer annulus formed between an outer surface of the length of tubing and an inside surface of the wellbore casing, wherein the outer annulus provides a flow path for the cooling medium circulated by the cooling pump.

5. The subterranean energy storage and retrieval system of claim 2, further comprising:
wherein an outer annulus is formed between an outside diameter of the length of tubing and an inside diameter of the wellbore casing and an inner annulus is formed vertically around an outside surface of the one or more battery cells and the inside surface of the length of tubing, wherein the cooling system pumps the cooling medium downhole through the inner annulus to the one or more battery cells and the cooling medium returns to the cooling pump through the outer annulus.

6. The subterranean energy storage and retrieval system of claim 1, further comprising:
a pressure activated switch attached to a bottom of the one or more battery cells;
an upper spring, wherein the pressure activated switch is held in an open circuit position by the upper spring, wherein the upper spring causes the pressure activated switch to disengage when the battery is pulled out of the wellbore and a weight of the one or more battery cells is removed from the upper spring and the pressure activated switch, wherein the switch is engaged to a closed position when the upper spring is compressed by the weight of the one or more battery cells when the one or more battery cells are lowered onto a retainer in the wellbore.

7. The subterranean energy storage and retrieval system of claim 6, further comprising:
a lower spring interposing the upper spring and the retainer, wherein a combination of forces of the upper spring and the lower spring limits a force applied on the pressure activated switch.

8. The subterranean energy storage and retrieval system of claim 1, further comprising:
a polymer shell surrounding the one or more battery cells.

9. The subterranean energy storage and retrieval system of claim 1, further comprising:
a plurality of end cap connectors on each end of each battery cell, wherein the battery cells are connected electrically to each other through the end cap connectors, wherein one or more of the plurality of end cap connectors are threaded end cap connectors, wherein adjacent threaded end cap connectors are mechanically fastened to each other.

10. The subterranean energy storage and retrieval system of claim 4, further comprising:
a load bearing basket surrounding the one or more battery cells, wherein the load bearing baskets snap together around the one or more battery cells and provide a flow path for the cooling medium to circulate around the battery cells.

11. The subterranean energy storage and retrieval system of claim 1, further comprising:
a cylindrical tubing connector that connects the length of tubing with the one or more battery cells to a further length of tubing, wherein the cylindrical tubing connector provides a central hole to accommodate an electrical connection and a plurality of perimeter holes providing a flow path for a cooling medium.

12. The subterranean energy storage and retrieval system of claim 6, further comprising:
one or more holes defined in the pressure activated switch that provide a return flow path for a cooling medium circulated to the battery.

13. A subterranean energy storage and retrieval system, the system comprises:
a wellbore, including a sealed interval and a casing;
a length of tubing installed within the casing inside of the sealed interval of the wellbore, the length of tubing including one or more battery cells placed inside the length of tubing;
and
an electrical connection attached to the one or more battery cells and extending to a surface of the wellbore.

14. The subterranean energy storage and retrieval system of claim 13, the system further comprising:
a cooling system that circulates a cooling medium to cool the one or more battery cells; and
a flow path for the cooling medium that enables the cooling system to pump the cooling medium across the one or more battery cells and to return to the surface.

15. The subterranean energy storage and retrieval system of claim 14, further comprising:
an inner annulus formed between an exterior surface of the one or more battery cells and an inner surface of the length of tubing; and
an outer annulus formed between an outside of the length of tubing and an inside diameter of the casing, wherein the cooling system circulates the cooling medium from the surface of the wellbore through the inner annulus, and wherein the flow path is formed by the inner annulus and the outer annulus.

16. The subterranean energy storage and retrieval system of claim 14, further comprising:
a bottom hole retainer in the wellbore; and
a pressure activated switch at a bottom of the length of tubing, wherein the pressure activated switch is disengaged until a weight of the length of tubing is resting on the bottom hole retainer.

17. A method, the method comprising:
sealing an interval in a wellbore including a casing;
placing one or more battery cells inside of a length of tubing within the casing inside of the sealed interval of the wellbore;
activating a pressure activated switch using a weight of the length of tubing with one or more battery cells; and
extracting electrical energy from the one or more battery cells at a surface of the wellbore.

18. The method of claim 17, further comprising:
circulating a cooling medium through an inner and outer annulus flow path to flow the cooling medium past the one or more battery cells.

19. The method of claim 17, wherein the one or more battery cells are a plurality of battery cells, and further comprising connecting the plurality of battery cells via a threaded end cap defined on each end of each battery cell, the threaded end caps enabling mechanical and electrical connections between the plurality of battery cells.

20. The method of claim 18, wherein the inner annulus is formed between an exterior surface of the one or more battery cells and an inner surface of the length of tubing, and wherein the outer annulus is formed between an outside of the length of tubing and an inside diameter of the casing in the sealed interval of the wellbore.

* * * * *